(12) United States Patent
Klinkman (10) Patent No.: US 11,097,455 B2
(45) Date of Patent: Aug. 24, 2021

(54) MULTI-SHOT MOLD PROCESS AND ASSEMBLY FOR PRODUCING A VEHICLE PANEL

(71) Applicant: U.S. Farathane Corporation, Auburn Hills, MI (US)

(72) Inventor: John Klinkman, Auburn Hills, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 361 days.

(21) Appl. No.: 16/214,512

(22) Filed: Dec. 10, 2018

(65) Prior Publication Data

US 2019/0315026 A1    Oct. 17, 2019

Related U.S. Application Data

(60) Provisional application No. 62/658,771, filed on Apr. 17, 2018.

(51) Int. Cl.
| | |
|---|---|
| *B29C 45/04* | (2006.01) |
| *B29L 31/30* | (2006.01) |
| *B29K 101/12* | (2006.01) |
| *B29C 45/16* | (2006.01) |
| *B62D 25/02* | (2006.01) |
| *B29K 23/00* | (2006.01) |

(52) U.S. Cl.
CPC ...... *B29C 45/0441* (2013.01); *B29C 45/1615* (2013.01); *B62D 25/025* (2013.01); *B29K 2023/00* (2013.01); *B29K 2101/12* (2013.01); *B29L 2031/3041* (2013.01)

(58) Field of Classification Search
CPC . B29C 45/0441; B29C 45/1615; B29C 45/33; B29C 45/1676; B29C 2045/0093; B29C 45/162; B62D 25/025; B29K 2023/00; B29K 2101/12; B29L 2031/3041
See application file for complete search history.

(56) References Cited

U.S. PATENT DOCUMENTS

| | | | |
|---|---|---|---|
| 5,904,002 A * | 5/1999 | Emerling | ................ B60J 5/0406 |
| | | | 49/502 |
| 6,171,543 B1 | 1/2001 | Hirose | |
| 6,371,548 B1 * | 4/2002 | Misaras | .................. B60R 13/02 |
| | | | 296/146.7 |
| 6,742,835 B1 | 6/2004 | Floarea | |
| 6,998,174 B2 | 2/2006 | Porter et al. | |
| 7,083,844 B2 | 8/2006 | Yamamoto | |
| 7,159,933 B2 | 1/2007 | Yamamoto | |

(Continued)

*Primary Examiner* — Jacob T Minskey
*Assistant Examiner* — Caroline Montiel
(74) *Attorney, Agent, or Firm* — Dinsmore & Shohl LLP (57) ABSTRACT

A method for producing a thermoplastic panel, including the steps of providing a rotary injection tool exhibiting a die cavity and featuring at least one lifter component within the cavity. The tool is positioned to orient the cavity in a first configuration during which a first shot injection molding of a doghouse is conducted onto a receiving location of the lifter component. The cavity is open and the tool rotated to reposition the cavity in a second configuration, following which a second shot injection molding operation is conducted for forming a skin of the panel in communication with the first shot doghouse clip. Following this, the mold is opened and the finished part removed.

11 Claims, 11 Drawing Sheets

(56) References Cited

U.S. PATENT DOCUMENTS

| | | |
|---|---|---|
| 7,354,102 B2 | 4/2008 | Cave et al. |
| 7,632,445 B2 | 12/2009 | Porter et al. |
| 7,963,586 B2 | 6/2011 | Muller et al. |
| 8,465,089 B2 | 6/2013 | Atkinson et al. |
| 8,480,167 B2 | 7/2013 | Flajnik et al. |
| 8,701,352 B2 | 4/2014 | Wade et al. |
| 8,960,781 B2 | 2/2015 | Rawlinson et al. |
| 9,926,016 B2 | 3/2018 | Saur et al. |
| 2003/0003252 A1 | 1/2003 | Yun et al. |
| 2003/0194542 A1 | 10/2003 | Springer |
| 2004/0065985 A1 | 4/2004 | Johnson |
| 2005/0218700 A1 | 10/2005 | Yamamoto et al. |
| 2005/0227042 A1 | 10/2005 | Cowelchuk et al. |
| 2005/0258569 A1* | 11/2005 | Schoemann ........ B29C 45/1635 264/255 |
| 2005/0274452 A1* | 12/2005 | Schoemann ........ B29C 45/1676 156/245 |
| 2006/0154027 A1* | 7/2006 | Dry .................... B60R 13/0243 428/138 |
| 2010/0140981 A1 | 6/2010 | Mildner et al. |
| 2012/0175848 A1* | 7/2012 | Leonard .................. F16L 21/03 277/624 |
| 2016/0059901 A1* | 3/2016 | Joseph ................. B62D 25/165 296/198 |
| 2018/0022397 A1* | 1/2018 | Richardson .......... B62D 29/002 296/187.03 |

\* cited by examiner

MULTI-SHOT MOLD PROCESS AND ASSEMBLY FOR PRODUCING A VEHICLE PANEL

CROSS REFERENCE TO RELATED APPLICATIONS

The present application claims the priority of U.S. Ser. No. 62/658,771 filed Apr. 17, 2018.

FIELD OF THE INVENTION

The present invention discloses an in-mold multi-shot injection molding assembly, method and article for producing a vehicle panel, such as a rocker panel. The assembly and method aspects include, in any variant, a first injection molded doghouse and a second stage injection molded panel skin. In this fashion, the present design eliminates the necessity of secondary operations during the assembly of an interior bracket of the panel or molding. A third stage injection molding or separate extrusion of such as a seal can be applied to the vehicle panel in a further variant.

BACKGROUND OF THE INVENTION

The prior art is documented with examples of vehicle panel designs, such as produced by injection molding techniques. This can include the injection molding formation of the panel being supplemented by a secondary stage post injection molding assembly operation in which an inner attachment bracket is separately provided and is heat staked or otherwise secured to an inside surface of the rocker molding. The inner attachment bracket in turn supports a dog house or clip assembly for attaching the panel to a suitably configured location of the vehicle.

Figure 1A:
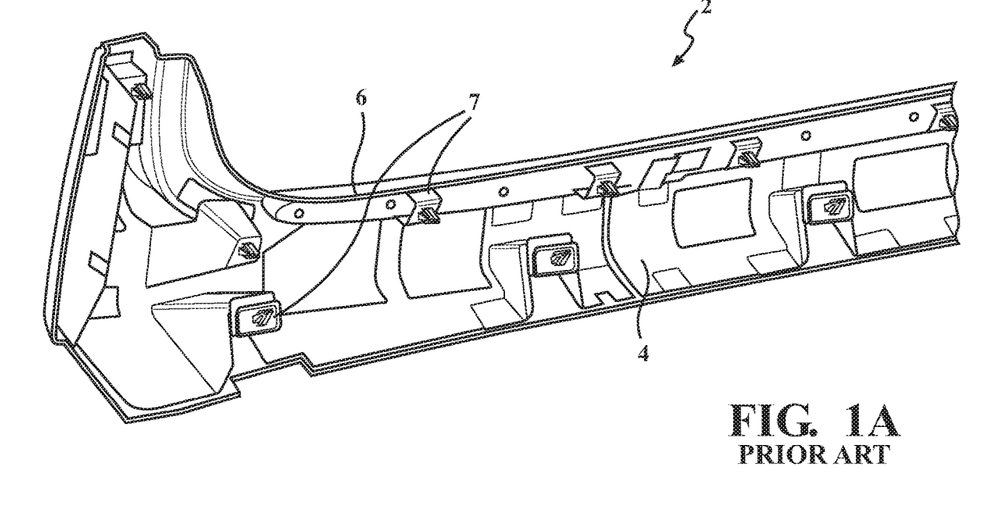
FIG. 1A is an illustration of an existing rocker panel design according to the Prior Art in which a secondary assembly operation is required for attaching, such as via heat staking, an inner bracket to a previously molded panel.
Figure 1B:
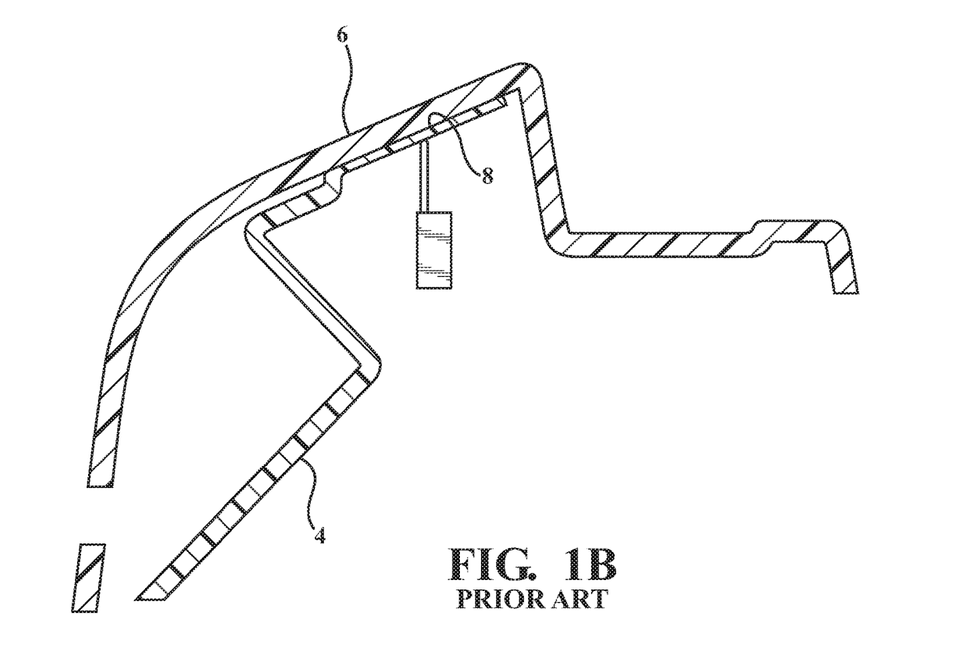
FIG. 1B is a side plan cutaway of the panel of FIG. 1A according to the Prior Art and which depicts the heat staking of the inner attachment bracket to the molded panel.
Figure 1C:
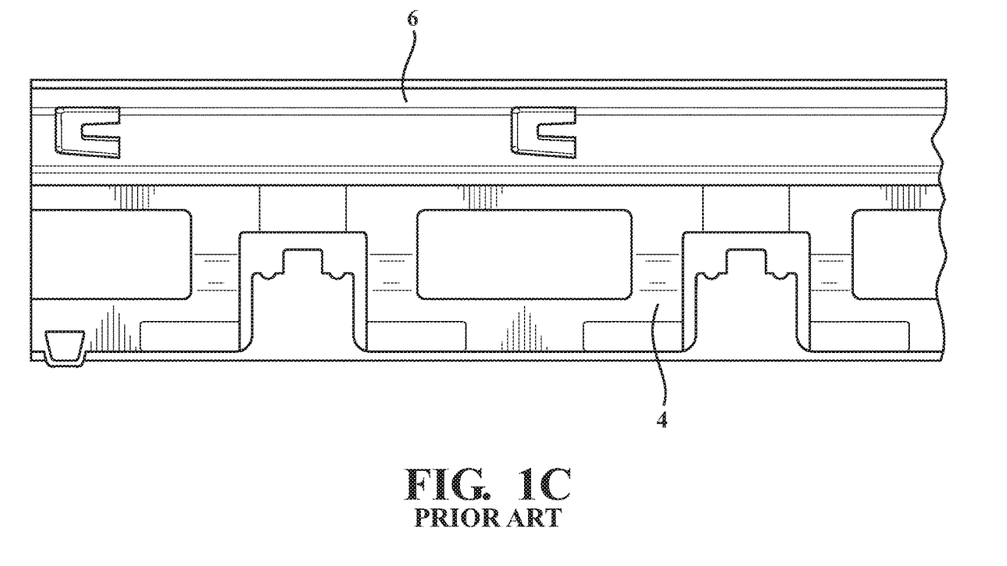
FIG. 1C is an inside plan view of the two panel design of FIG. 1A.

An example of a conventional panel is depicted in FIGS. 1A-1C which illustrates an existing rocker panel design 2, and in, following an injection molding of the panel in a static (non-rotating) single shot mold, a secondary post molding assembly operation is required for attaching, such as via heat staking, an inner bracket 4 to the previously molded panel 6. Also shown are examples of doghouse supported clips 7 attached to various locations of the panel.

FIG. 1B is a side plan cutaway of the panel of FIG. 1A, again according to the Prior Art, and which depicts the heat staking (see at location 8) of the inner attachment bracket 4 to the molded panel. FIG. 1C additionally provides an inside plan view of the two panel design of FIG. 1A.

Additional examples of existing rocker panel constructions include the injection molded rocker panel of Flajnik, U.S. Pat. No. 8,480,167, which teaches a panel assembly for attachment to a vehicle. A rocker panel body has a first end feature situated on a first end of the rocker panel body and a second end feature situated on a second end of the rocker panel body. The rocker panel body provides an outside surface generally presented in the form of a convex surface, and an inside surface generally presented in the form of a concave surface. The outside surface of the rocker panel body extends outwardly of the vehicle, to present an outboard section having a predetermined profile based on targeted aesthetic/performance characteristics. The inside surface of the rocker panel body has at least one transverse rib positioned therein, the transverse rib being arranged generally perpendicular to the longitudinal axis of the rocker panel body.

Springer, US 2003/0194542 teaches a door trim panel for a vehicle which includes an inner surface for facing a vehicle interior and an outer or "B" surface facing the inside of a vehicle door. Various components typically found on the "B" surface of the door trim panel are added to the panel in the present invention by a molding process. The components are preferably formed from a thermoplastic, and the door trim panel itself comprises a fiber or thermoplastic panel capable of forming a mechanical or a fusion bond with the components. Examples of the components which may be added to a panel using the present invention include locators, ribs or other reinforcement members, attachments for wire harnesses, supports, doghouses, flanges, etc. It is also desirable to use recycled material in the panel.

U.S. Pat. No. 6,171,543, to Hirose, teaches an improved rocker panel construction and method for producing. The rocker panel includes a show surface, a hidden surface opposite the show surface, and a plurality of clip house mounting structures, each including a top leg and a bottom leg for connecting the clip house mounting structure to the hidden surface. Additional process steps include each of providing a mold having a mold cavity shaped like the rocker panel, a show surface corresponding to the rocker panel show surface, a hidden surface corresponding to the rocker panel hidden surface. Other process features include a top leg cavity portion corresponding to the top leg, a bottom leg cavity portion corresponding to the bottom leg, a first channel-defining surface defining a first channel cavity, the first channel-defining surface being in fluid communication with the bottom leg cavity portion and contiguous with the hidden surface, and at least one sprue in fluid communication with the first channel cavity.

Other features include injecting a predetermined amount of thermoplastic material into the mold cavity, injecting a predetermined amount of gas into the first channel cavity to form a first strength enhancing rib to resist the tendency of the panel to flex or pivot thereat when the rocker panel is stepped on, and allowing the thermoplastic material to set.

Floarea, U.S. Pat. No. 6,742,835, teaches a rocker panel molding of a polymer material and includes a front section and a rear section joined by bridge arrangements. A preferred embodiment includes two bridge elements connected to a rear edge of the front section and to a front edge of the rear section. The bridge elements span a gap between the front and rear edges and allow for longitudinal expansion of the rocker panel moldings to accommodate thermal expansion in the underlying rocker panels and to provide for slight longitudinal adjustment in the rocker panel moldings while fitting the moldings to rocker panels.

Finally, U.S. Pat. No. 7,159,933 to Yamamoto, teaches a rocker pane/clip house combination in which a first support member of the clip house is connected to the rocker panel at a first junction that is located between the top surface of the part and a depending side surface. The side surface is connected to a part surface at a second juncture or radiused section. A second support member of the clip house is attached to the surface at a location that is laterally spaced from the second juncture.

SUMMARY OF THE INVENTION

The present invention discloses each of rotary two shot and three shot methods, assemblies and articles for producing a molding or panel, such including but not limited to a vehicle rocker panel. The method and assembly aspects improve upon prior art designs by reconfiguring the mold to utilize lifter components within its interior configuration to provide support for injection molding any number of doghouse configurations as part of the first material shot. Upon repositioning the cavity and tooling, such as with the use of a rotary mold apparatus, a panel skin is formed in a second shot in communication with the first shot doghouses, following which the completed article is removed from the mold and any supporting clips or the like are attached to the first shot injection molded doghouses as part of any post molding operation.

In an optional variant, a soft flexible seal can be applied to the panel and can be formed either as a third shot injection molded material (such utilizing a second barrel of a different and typically softer material than which is used during the first and second shot injection molding of the doghouses and panel skin). Alternatively, the softer seal can be extruded onto a previously two shot produced panel.

The process and associated tooling can further integrate a core pull-back mechanism during the formation of the third shot flexible seal, and which initially allows a portion of the tooling to block the flow of plastic to the soft seal portion of the tool, following which the blade is retracted to allow for progressive formation of the lip seal or the like, with the soft material of the seal bonding to the second shot rigid material. Other variants and techniques also contemplate that the third shot softer seal material can be integrated between separate rigid portions of the second shot skin defining the panel as part of the injection molding process.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to attached illustrations, the present invention discloses a variety of rotary two shot and three methods, assemblies and articles for producing a molding or panel, such including but not limited to a vehicle rocker panel. As previously described, the method and assembly aspects improve upon prior art designs by reconfiguring the mold to utilize lifter components within its interior configuration to provide support for injection molding any number of doghouse structures as part of the first material shot. Upon repositioning the die tool, such as within the rotary mold apparatus, a further mold cavity configuration provides for forming the panel skin in a second shot, following which the completed article is removed from the mold.

Figure 2:
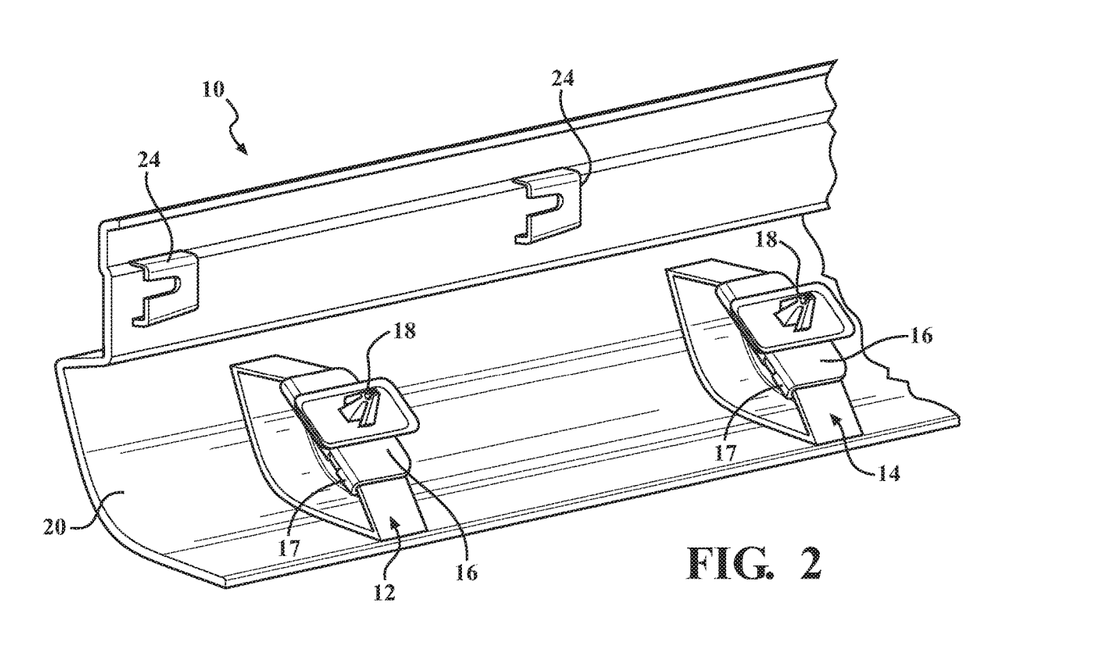
FIG. 2 is a perspective view of the two stage injection molded rocker panel according to one non-limiting embodiment of the present invention and illustrating a pair of lifters integrated into the geometry of the die tooling, the lifters providing support location for the first shot injection molding of the doghouse clip structures, the tooling further being manipulated in a second rotary shot fashion for subsequently injection molding the panel skin.

FIG. 2 is a perspective view, at 10, of the two stage injection molded rocker panel according to one non-limiting embodiment of the present invention. As previously described, the panel is created in one non-limited application utilizing a rotary mold assembly. As will be further described, the present invention also contemplates any other type of mold assembly, such possibly including indexing type assemblies which can be integrated into or other hybrid rotary and/or linear style molding configurations for creating a panel.

For purposes of ease of illustration, a number of the features of the rotary die mold are not illustrated in detail. Such can include the incorporation of a pair of lifters integrated into the geometry of the die tooling for creating the doghouses. The lifters additionally provide for repositioning the second shot injection molded skin panel which is formed in contact with the first shot doghouses and in order to complete a panel article, thereby avoiding the requirement of secondary assembly or welding operations for securing a doghouse post molding to the panel, and while also providing a panel produced with lower cost and less weight.

Referencing again FIG. 2 et seq., a representation of the first shot injection molded doghouses are shown at 12 and 14. The doghouses 12 and 14 as shown each exhibit an enclosed perimeter extending profile defined by a three dimensional strap or band having an inner crescent shaped portion (see also as shown in plan view illustration in FIG. 3 by inner crescent portion 12' of selected doghouse 12, with the outer extending portion of each doghouse further illustrated by interconnected and segmented surface locations (12", 12''' and 12''''). As previously explained, the lifters (not shown) provide the necessary support locations in the initial mold configuration for the first shot injection molding of the doghouses 12 and 14.

Also shown are clip supporting structures, each having a clip support base 16 and an integrally configured and projecting clip engagement profile 18 which can be mounted to the doghouses 12 and 14 following completed molding of the panel (by subsequent second stage formation of the integrated skin 20 as will be described below). As further shown, the clip support base 16 can include a flattened configuration with fold-over edge clips 17 for engaging the doghouses (see also as described in reference to FIG. 4).

Following formation of the doghouses 12/14 in the first shot cavity depiction (see also FIG. 6), the tooling is further manipulated in a second rotary shot fashion (referencing subsequent FIG. 7) for injection molding the panel skin 20 and which occurs in such as fashion as to skin-over or contact the perimeter locations of the doghouses 12/14. Following completion of the panel, the doghouse clips, again shown by individual configurations at 16, 17 and 18 FIG. 2, can be installed to the doghouses at the time of mounting the panel 10 to the vehicle.

Figure 3:
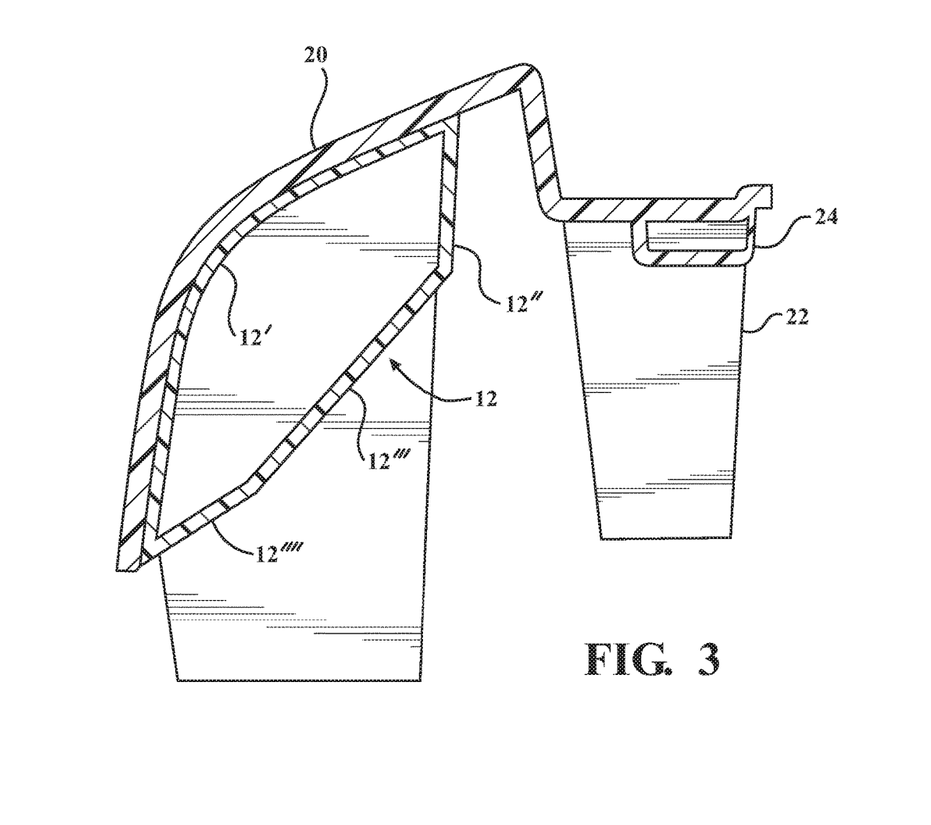
FIG. 3 is a side plan cutaway of FIG. 2 and illustrating first and second lifter configurations in combination with the second shot panel skin, the first and second molding operations including the provision of a suitable thermoplastic material not limited to a (TPO) thermoplastic olefin, or any other suitable polymer/filler blend usually consisting of some fraction of a thermoplastic, an elastomer or rubber, and usually a filler.

Referencing FIG. 3, a side plan cutaway of FIG. 2 is shown and which illustrates the cohesive bond enabled by the tool integrated lifter locations, the selected doghouse 12 again being shown in profile and a further version at 22 for creating profile 24, this in combination with the formation of the second shot panel skin 20. The first and second molding operations include the provision of a suitable thermoplastic material not limited to a (TPO) thermoplastic olefin or any other suitable polymer/filler blend usually consisting of some fraction of a thermoplastic, an elastomer or rubber, and usually a filler. It is also envisioned that first and second thermoplastic materials of varying durometer can be produced, such including the first shot dog houses 12/14 having a harder, more rigid construction such as associated with a TPO, with the second shot panel 20 also including softer materials.

Figure 4:
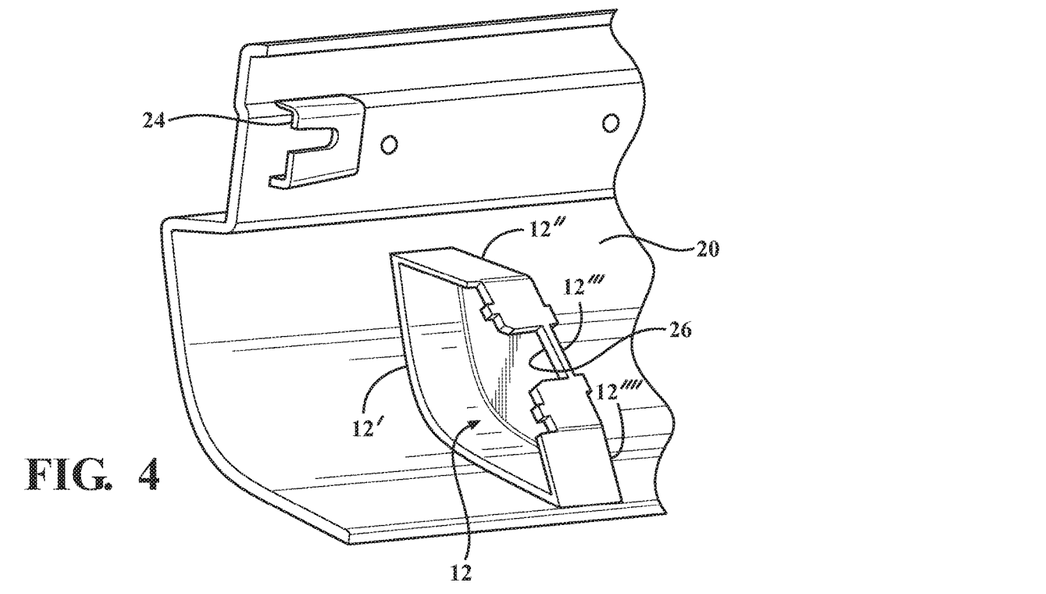
FIG. 4 is an enlarged and partial perspective illustration of a finished rocker with a first shot injection molded (IM) doghouse (required lifter not shown), the second shot panel again being illustrated.

FIG. 4 is an enlarged and partial perspective illustration of the selected doghouse 12 assisted with die tooling lifter components (not shown) and its pre-first shot mold structure. Also shown at 26 is a receiving configuration within the outer intermediate location 12''' of the selected doghouse 12 for receiving the clip structure 16 with configured fold over mounting edge 17. The second shot panel is again illustrated at 20.

Figure 5:
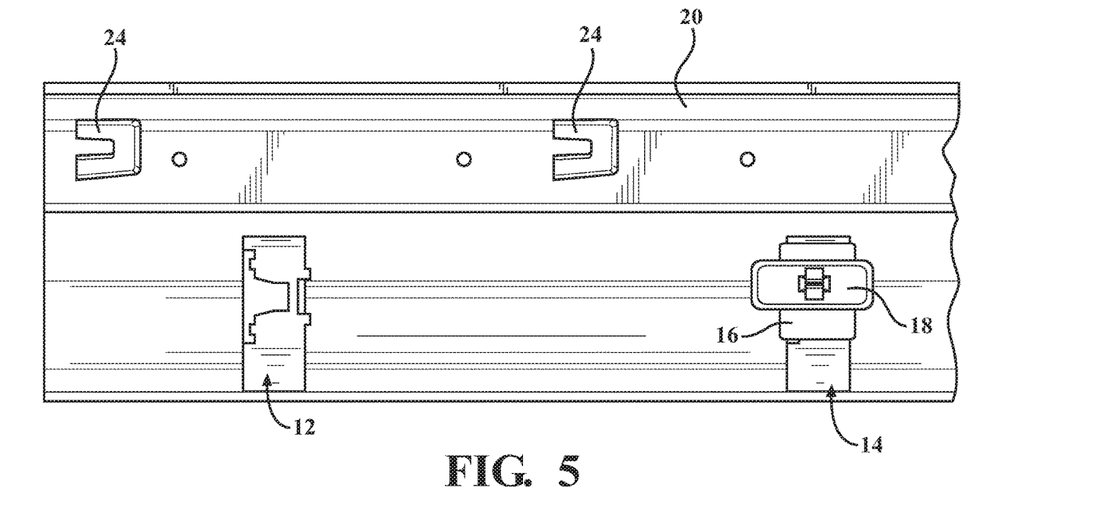
FIG. 5 is an inside plan view of the two shot panel of FIG. 2 and illustrating the doghouse being produced according to a first shot injection molding operation, following which the tool is rotated and a new cavity (corresponding to the rocker molding) is presented to the previously formed dog house structure for allowing the second shot panel to occur, such being applied in a "skin-over" fashion to the first shot dog houses.

FIG. 5 is an inside plan view of the two shot panel of FIG. 2 and illustrating the doghouses 12 and 14 produced according to the first shot injection molding operation, following which the tool (represented by lifter formed bond locations) is rotated and a new cavity (corresponding to the rocker molding) is presented to the previously formed dog house structure for allowing the second shot panel 20 to occur, such being applied in a "skin-over" fashion to the first shot dog houses.

Figure 6:
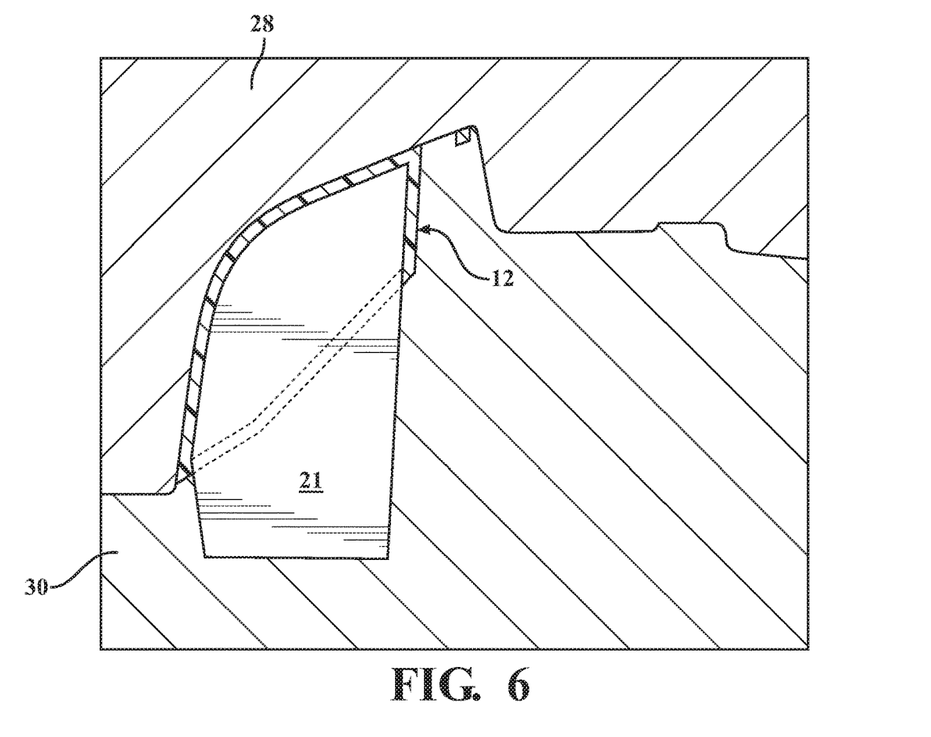
FIG. 6 is a sectional plan cutaway of the cavity and common core orientation associated with the first injection molding formation of the dog house clips.
Figure 7:
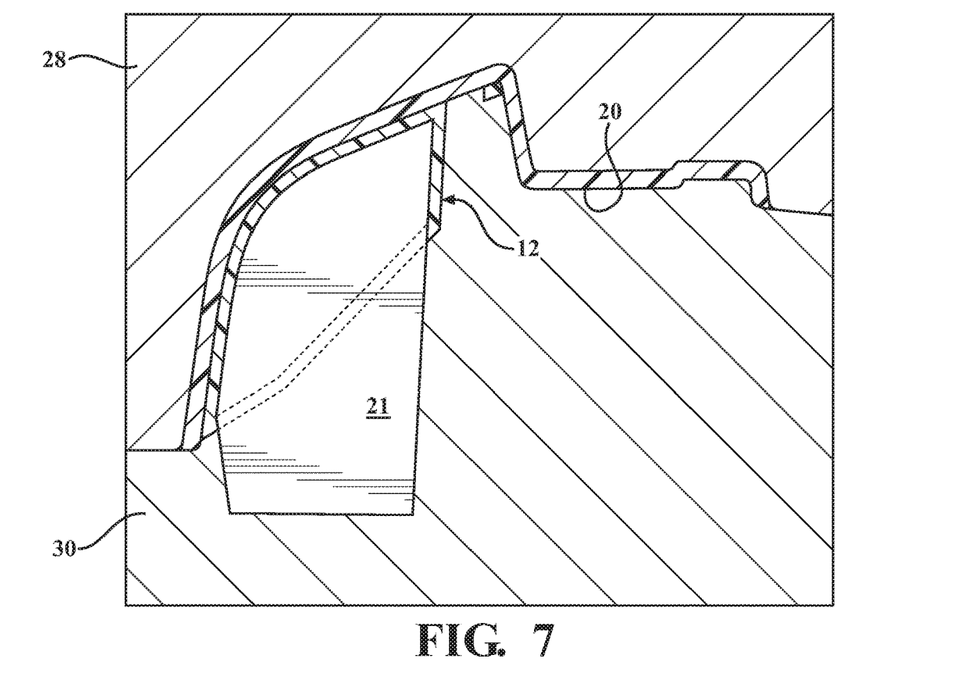
FIG. 7 is a sectional plan cutaway corresponding to rotation of the die tool in order to reconfigure the cavity associated with the second injection molding formation of the rocker molding skin.

As previously described, FIG. 6 is a sectional plan cutaway of the cavity and common core orientation associated with the first injection molding formation of the dog houses, with FIG. 7 further providing a sectional plan cutaway corresponding to rotation of the die tool in order to reconfigure the cavity associated with the second injection molding formation of the rocker molding skin, again at 20. Each of FIGS. 6 and 7 depict upper 28 and lower 30 mold cavity halves which operate in combination with the separate lifter supports (see at 21) to permit reconfiguration of an interior mold cavity between the first position of FIG. 6 (in which the opposing surfaces of the cavity halves are substantially sealed against each other for forming only the doghouses 12/14) and the second position of FIG. 7, in which the spacing between the cavity halves is established for forming the panel skin 20 in a manner which the lifter components position the dog house 12/14 to ensure that the skin 20 forms around and in contact with the base or skirt of the clips to ensure the integrity of the formed panel 10.

Figure 8:
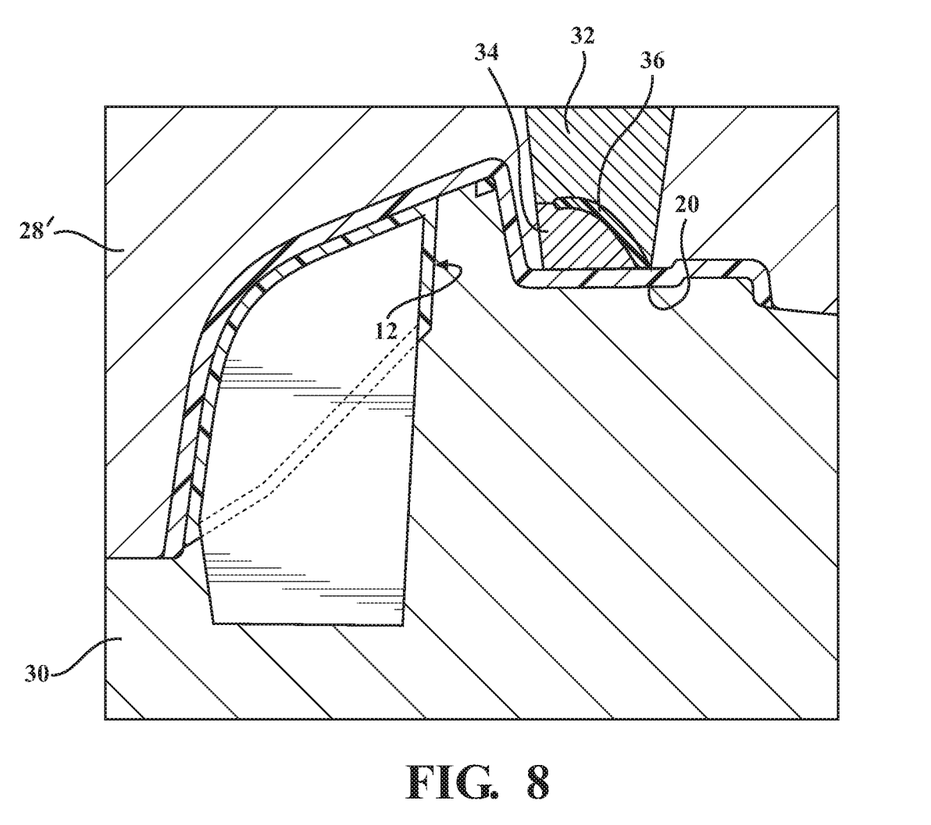
FIG. 8 is an illustration similar to FIGS. 6 and 7 of a related process for forming a rocker panel having a third shot seal, such constructed of different material using a second injection molding barrel.

Proceeding to FIG. 8, an illustration similar to FIGS. 6 and 7 is shown generally of a related process and assembly for forming a rocker panel having a third shot seal, such constructed of different material using a second injection molding barrel. The depiction of FIG. 8 proceeds from FIGS. 6-7 and includes a reconfiguration at 28' of the upper cavity half in combination with the lower cavity half 30 (common core) for producing a third shot flexible seal (such as a TPV material. The redesigned upper cavity 28' incorporates subset cavity portions 32 and 34 which are configured in a third stage injection molding operation for forming the flexible seal, at 36.

FIGS. 6-8 are depicted in simplified fashion without such features as the secondary lifter components (correspond to 22 in FIG. 3). The three shot process of FIG. 8 further contemplates the use of a second barrel (not shown) for injection molding the blade configured seal 36 of a separate softer material. Without limitation, the first barrel (also not shown) is envisioned to produce the first shot doghouses 12/14 and second shot skin 20 from a harder common material (such without limitation including a thermoplastic olefin), with the second barrel forming the seal 36 from a second softer material (such without limitation including any thermoplastic elastomer).

Figure 9:
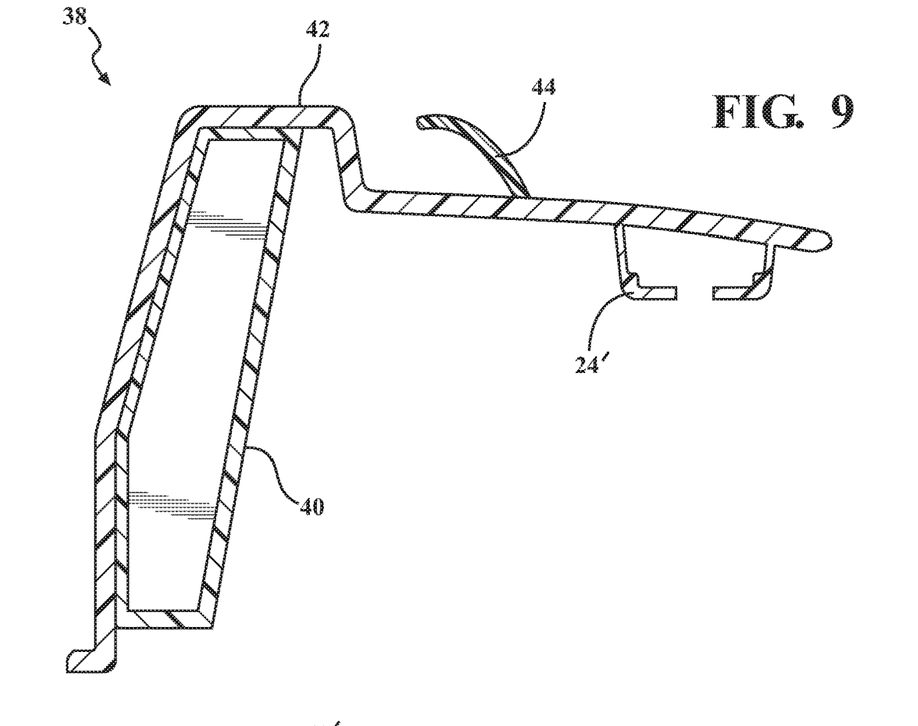
FIG. 9 is a side cutaway illustration of a panel design depicting a first shot clip attachment, second shot skin and third shot seal.

FIG. 9 is a side cutaway illustration of a modified panel design 38 depicting a first shot clip doghouse, second shot skin and third shot seal which is similar to that produced in FIG. 8 and including a first shot (e.g. thermoplastic olefin or TPO) doghouse 40, a second shot skin 42 (e.g, TPO) and a third shot softer blade 44 (e.g. TPE) so that the blade can include any angled or arcuate profile as desired. As with the preceding embodiment, the first cavity representation (see again related FIG. 6) configures the lifters with the repositionable upper cavity and lower (common) cavity in order to produce the initial doghouses 12/14, the repositioning the lifters and upper cavity reconfiguring to an arrangement similar to FIG. 7 in order to form the second shot skin 42 (along with clip receiving structure 24' corresponding to 24 in FIG. 3). The two shot formed panel is then reconfigured into the die arrangement as shown in FIG. 8 in order to form the blade shaped seal 44 using the second softer material and the subset portions 32/34 of the upper die.

Figure 10:
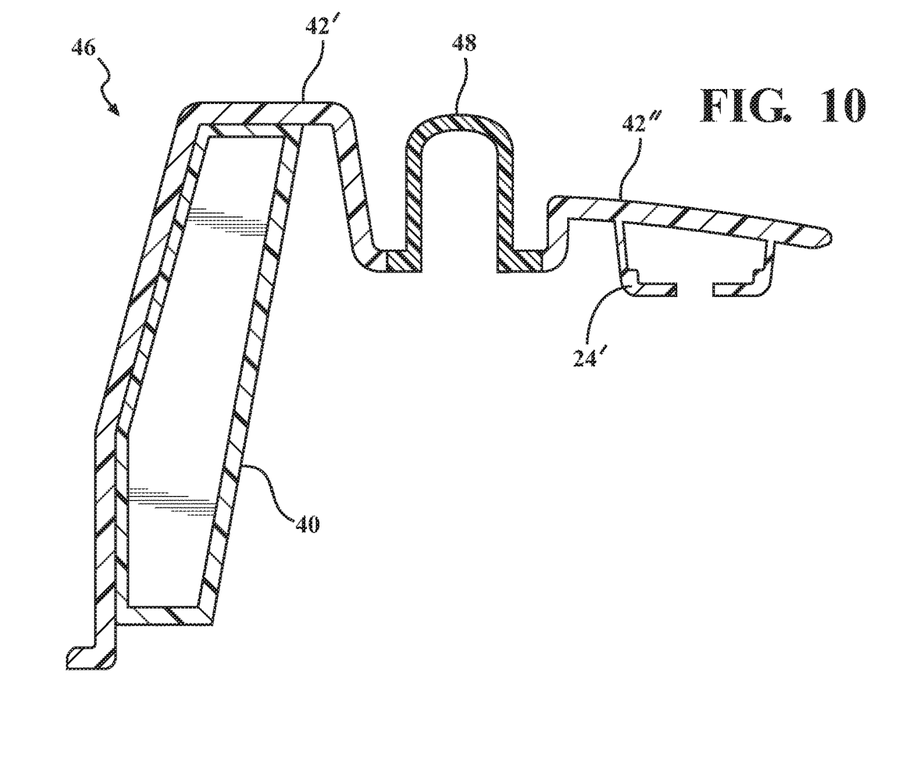
FIG. 10 is a further side cutaway illustration of a panel design with a reconfigured third shot seal which interconnect individual sections of the second shot panel skin.

FIG. 10 is a further side cutaway illustration of a panel design 46 with a reconfigured third shot seal, see as "U" shaped at 48 and which can include a TPE material, which interconnect individual sections 42' and 42" of the second shot panel skin. The panel 46 is similar to that shown at 38 in FIG. 9 and includes a similar doghouse 40 formed in a first injection molding stage through the assistance of the lifter positioning components.

Figures 11, 12A:
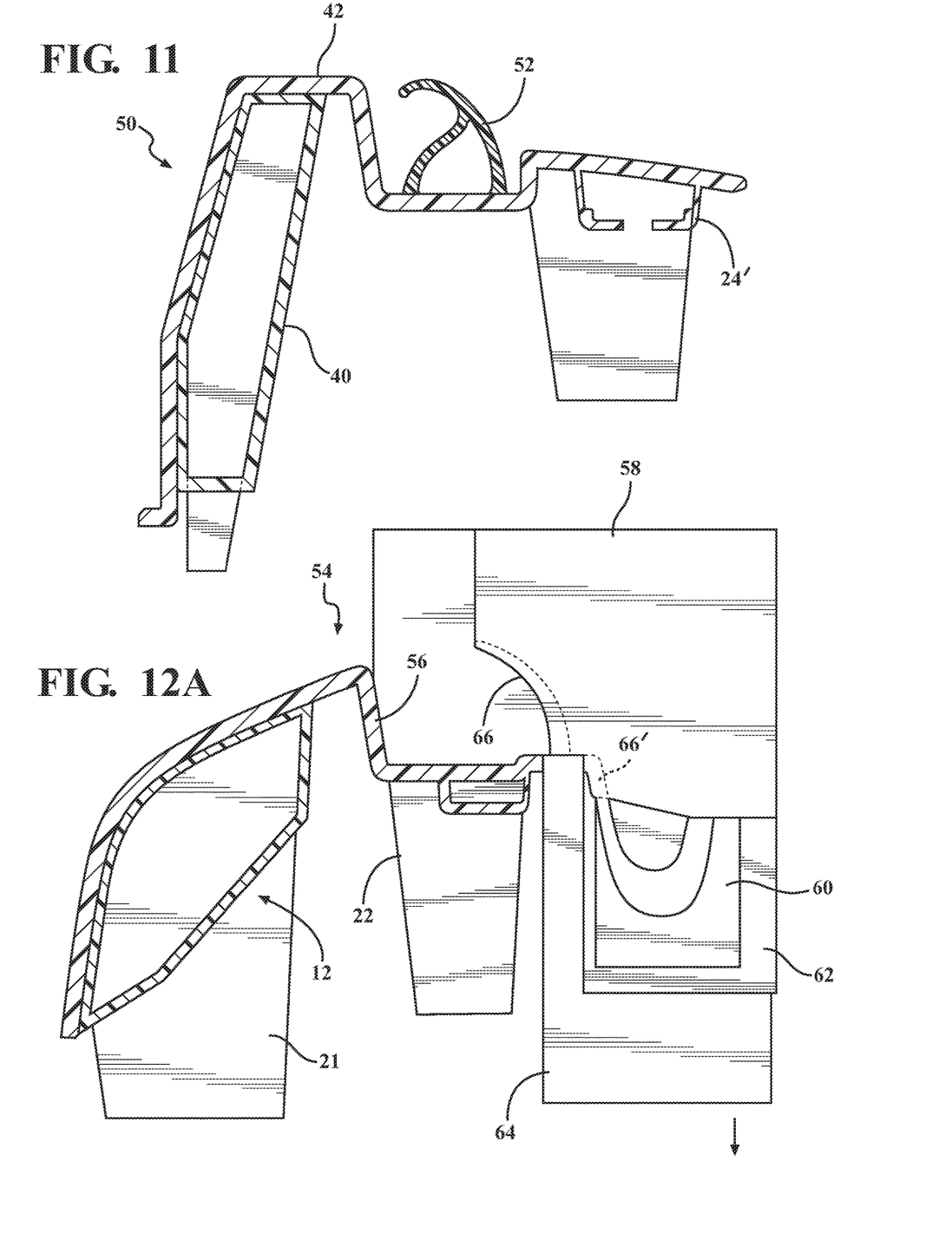
FIG. 11 depicts an alternate arrangement in which a seal is provided by an extrusion process to the two shot formed panel.
FIG. 12A is a cutaway illustration of a die process for forming a three shot panel similar in respects to that depicted in FIGS. 8-9 and illustrating a core pull-back mechanism depicted in a first closed position for partially forming the third shot soft seal portion.

FIG. 11 depicts an alternate arrangement of a panel 50 in which a redesigned seal 52 is provided by an extrusion process to the two shot formed panel 38 of FIG. 9. Without limitation, the present invention contemplates producing any of a two shot injection molded panel, as well as either of a third shot molded or separately extruded blade.

FIG. 12A is a cutaway illustration of a die process, generally at 54, for forming a three shot panel similar in respects to that depicted in FIGS. 8-9 and illustrating a core pull-back mechanism depicted in a first closed position in which a blade (at 64) prevents formation of the soft last shot lip seal (represented by closed spaces 66 and 66'. For ease of presentation, a majority of the upper and lower cavity halves are not depicted. Also, and similar to the previous embodiments shown, the lifter components 21 and 22 are likewise shown for assisting in the first and stage molding of the doghouses (see again at 12) and second stage molding of the panel skin (at 56).

Figure 12B:
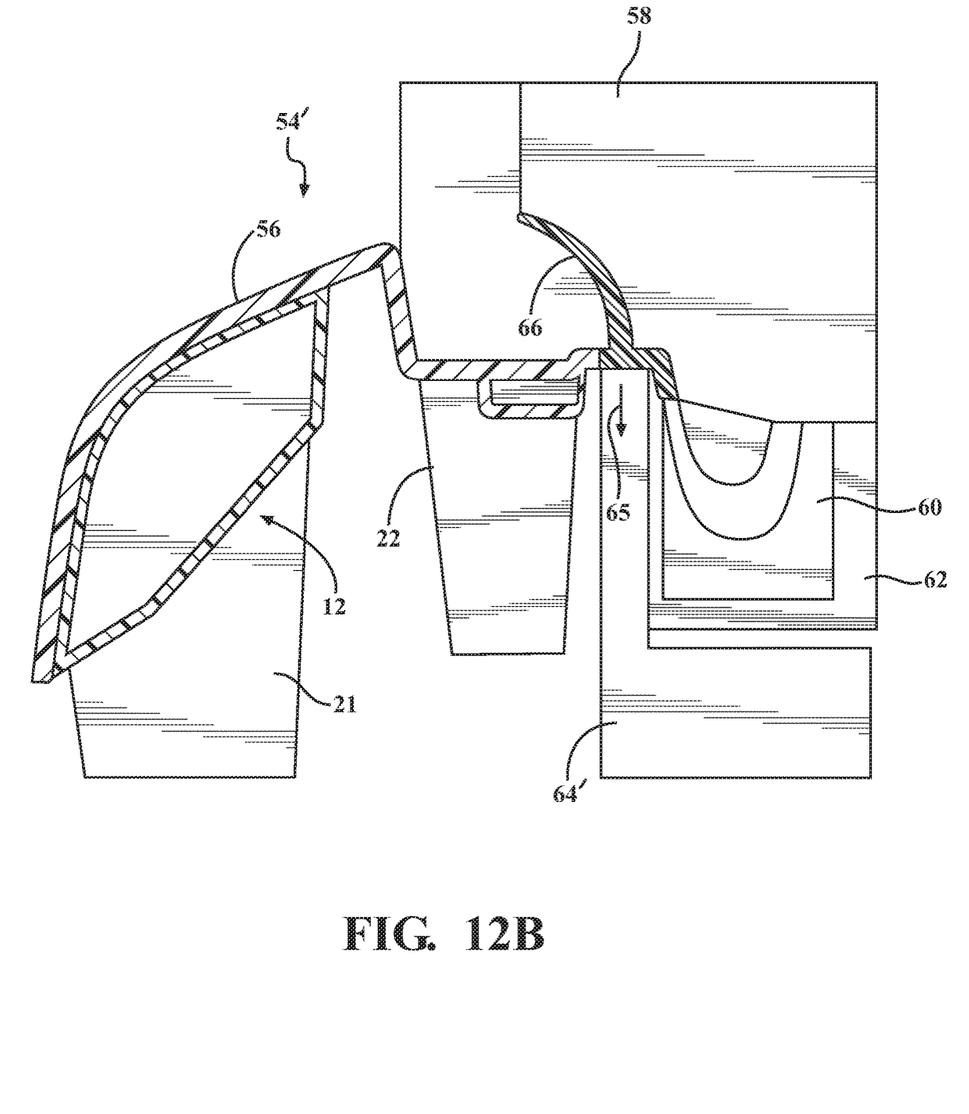
FIG. 12B is a succeeding illustration to FIG. 12A and depicting the actuation of the core pull-back mechanism for un-blocking the flow of third shot soft plastic in order to complete injection molding of a remaining end-most base portion of the third shot seal.

The core pull-back mechanism includes an upper slide 58 configured into the upper variable cavity half. Additional components integrated into the lower cavity half include each of a cashew insert 60, blade cap 62 and the retractable blade defining portion, again at 64. During a third (or any individual) stage injection molding, the core-pull back depiction of FIG. 12B (see retraction of blade defining portion to position 64' as defined by downward arrow 65) results in the blade unblocking the continued flow of the softer third shot material so that the same can progressively fill the interior cavity spaces 66/66' depicted in FIG. 12A and in order to bond to the second shot rigid panel 56 and, in this fashion, complete injection molding of a remaining endmost base portion of the third shot seal.

Figure 13:
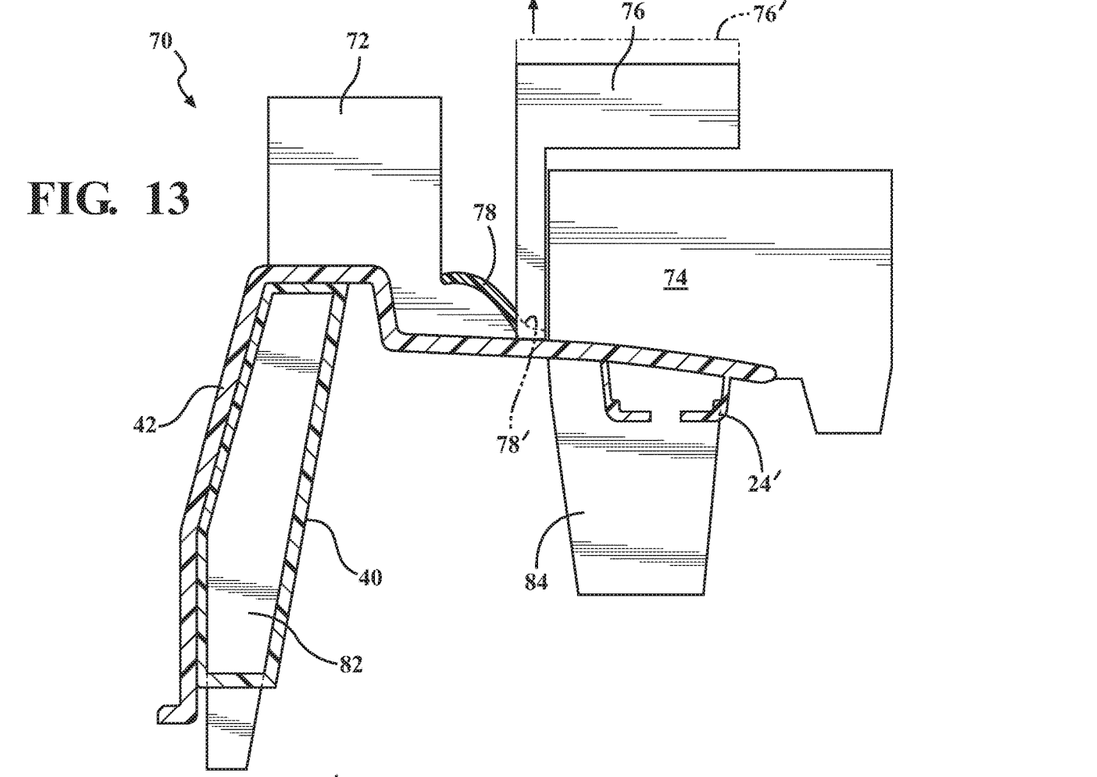
FIG. 13 is an illustration of a further variant of three shot injection molded panel with a different version of core pull-back mechanism for forming a third shot soft seal.

FIG. 13 is an illustration of a further variant 70 of three shot injection molded panel with a different version of core pull-back mechanism for forming a third shot soft seal. The initial two shot formed panel 42 in FIG. 13 generally replicates that formed in FIG. 11, with the third shot core pull-back mechanism including a reconfiguration of upper cavity half defined insert 72, blade cap 74 and upwardly retractable cover blade 76. As with the related variant of FIGS. 12A-12B, the core pull-back mechanism cooperates with the introduction of the third shot softer material to form, initially, the end of the blade (see at 78) and then, resulting from retraction of the cover blade to position 76' a base molding location 78' of the blade which bonds to the surface of the second shot (harder) panel 42.

Figure 14:
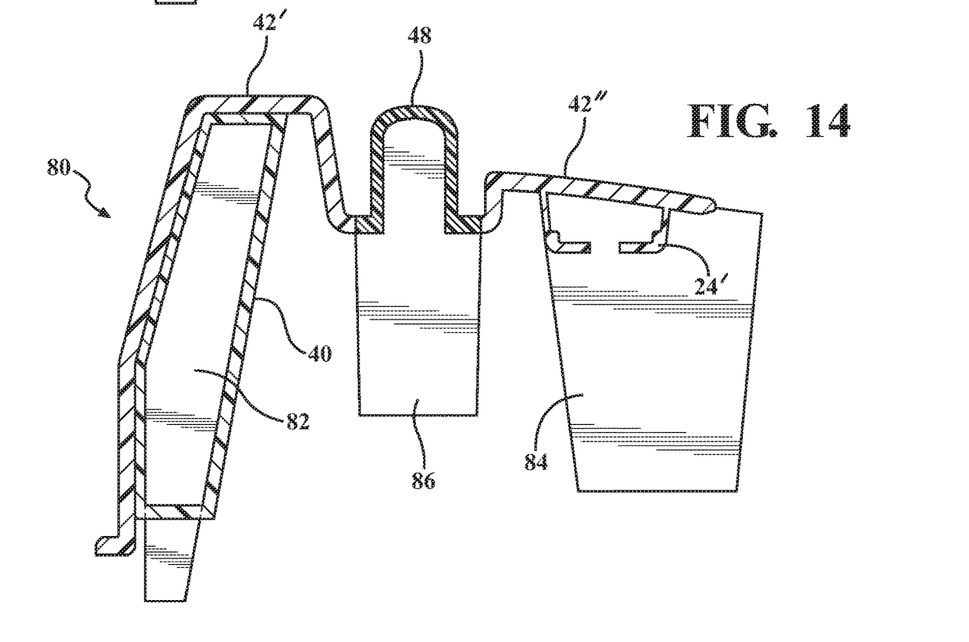
FIG. 14 is a die representation of the panel generally shown in FIG. 10 with opposite end located lifters and an middle supporting core-back portion.

FIG. 14 is a die representation of the panel 80 generally similar to that shown in FIG. 10, again with opposite end located lifters 82 and 84 and a middle supporting core-back portion 86 to assist in formation of the first shot doghouses (again at 40) and second shot skin (further at 42' in FIG. 14). Without limitation, the core pull-back geometry can be designed to form any of a blade onto a previously formed surface of the panel or, as shown, can be configured to join separate second stage molded skin portions in the manner shown.

Figure 15:
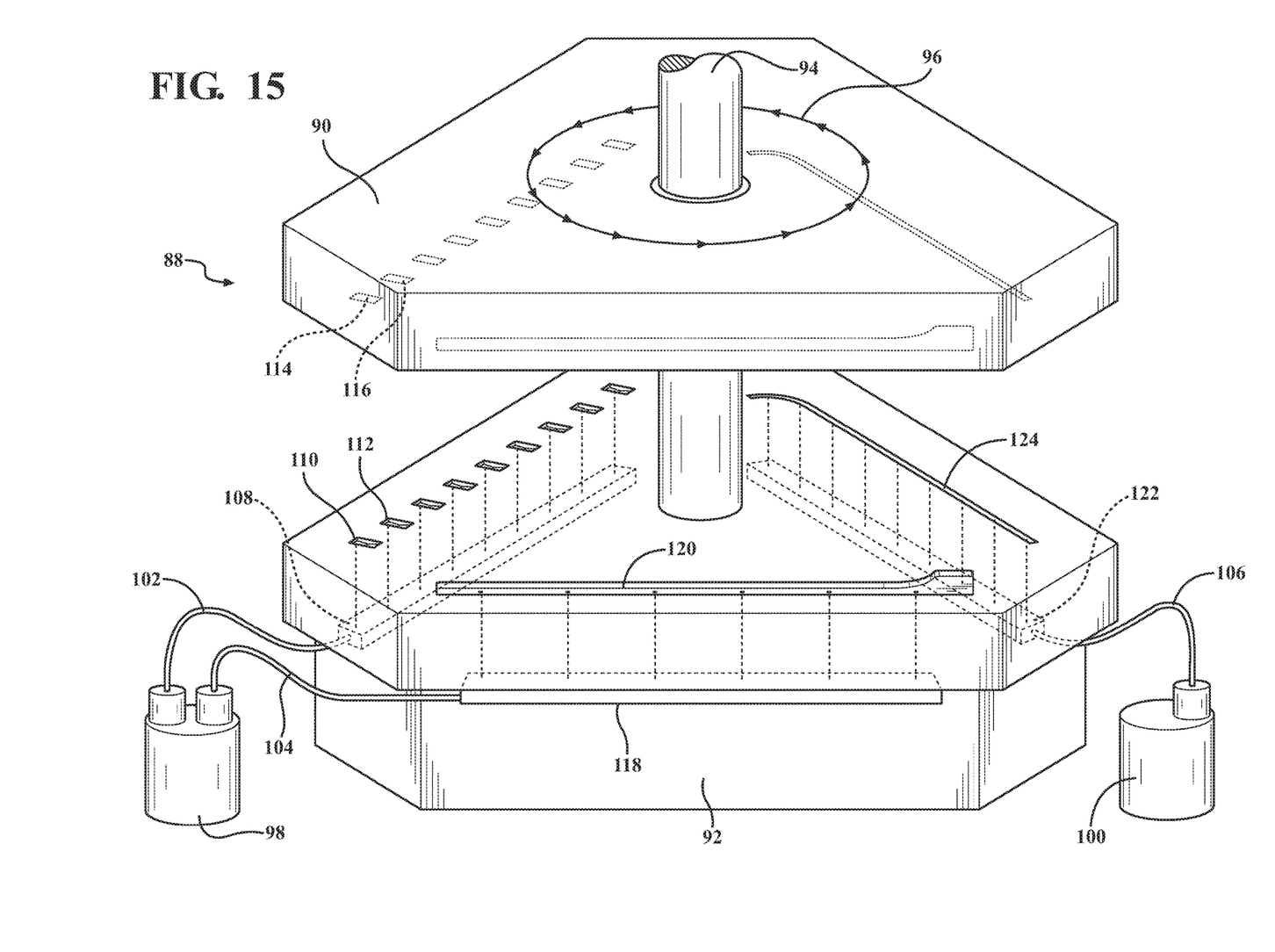
FIG. 15 is a perspective illustration according to one further non-limiting embodiment of a variant of three shot rotary injection molding die for forming a panel according to another assembly of the present invention.

Finally, FIG. 15 is a perspective illustration according to a non limited further embodiment of a variant of three shot rotary injection molding die for forming any suitable panel according to the present invention. The die includes a three position upper retractable/rotatable cavity half 90 in combination with a lower stationary (common core) cavity half 92. The upper half 90 is further supported via a vertical extending lift and rotate shaft 94 relative to the lower common half 92 and so that the upper mold half 90 can be successively elevated, rotatably advanced (see arrow 96) and lower back into alignment with the lower fixed half 92.

In the embodiment shown, each of the upper 90 and lower 92 cavity halves exhibit a generally three dimensional triangular shaped body with varying opposing and selectively aligning cavity portions for producing any two or three shot injection molded panel or like article. A first injection molding barrel 98 is provided (such as supplying a first shot thermoplastic material not limited to a TPO) along with a second injection molding barrel 100 (such as supplying a second shot softer TPE or like material).

The first barrel 98 includes a pair of supply lines 102 and 104 corresponding to the formation of the first shot doghouse clip supports and the second shot panel. The second barrel 100 includes a single supply line 106 for the third shot formation of the softer blade component.

The supply line 102 communicates with a first stage lower cavity profile which includes a common interior manifold 108 which can communicate the first stage molded material to a plurality of doghouse supporting clip forming locations (see at 110, 112, et seq.). The first stage underside of the upper cavity 90 illustrates in phantom a plurality of aligning cavity locations 114, 116, et seq., which, upon closing the upper mold halve in the position of FIG. 15, allows the formation of the first stage doghouse clip supports.

Upon completion of the first stage molding, the upper mold half 90 is retracted and advanced so that the lifters (supporting the first shot doghouse supporting clips as previously described) are rotated and subsequently descended into arrangement with the lower cavity half 92 so that the previously formed doghouse clips are configured in communication with a recess profile for forming a panel skin. This includes the second supply line 104 of the first barrel 98 providing thermoplastic (TPO) material to a manifold 118 in order to form any desired panel skin 120. As previously described, the configuration of the lifter components results in the doghouse clip supports being positioned in communication with an interior volume corresponding to the formation of the second stage panel skin and so that the clips are bonded to the panel skin.

Successive elevation and third stage rotation of the upper cavity half 90 (see again arrow 96) results in alignment of the two shot panel with a third shot location for forming the softer (TPE) blade. This includes a common manifold 122 for communicating the second shot material to a blade edge profile 124 in communication with the second shot formed skin in the manner previously described. Although not shown, a suitable core pull-back mechanism can be integrated into the mold and die assembly of FIG. 15 for configuring any three shot blade design not limited to those described and illustrated herein.

Without limitation, alternate assembly configurations can also envision utilizing any indexing version of an injection molding tool, such as which can include any multi-station (such as two or three) tool positions, and which can further include any additional structure such as pick and place functionality to assist in the creation of the multi-stage panel. Other variations can be configured to permit the press/platen supports to rotate at any of 180° or 120° angular offset positions, such depending upon whether a two or three rotary station assembly is being utilized.

Having described my invention, other and additional preferred embodiments will become apparent to those skilled in the art to which it pertains, and without deviating from the scope of the appended claims:

I claim:

1. A method for producing a thermoplastic panel, comprising the steps of:
    providing a rotary injection tool exhibiting a die cavity and featuring at least one lifter component within the cavity;
    positioning the tool to orient the cavity in a first configuration;
    injection molding, in a first shot, a multi-sided and band shaped doghouse onto a receiving location of the lifter component, said doghouse including each of an inner crescent shaped portion and at least one outer interconnected segmented surface portion for mounting a separate clip;
    repositioning the band shaped doghouse within the cavity in a second configuration and subsequently injection molding, in a second shot, a skin of the panel against the inner crescent shaped portion of the first shot doghouse in order to bond the first shot doghouse to an inside of the second shot skin; and
    opening said mold and removing the finished part.

2. The method as described in claim 1, further comprising the step of injection molding a thermoplastic olefin in at least one of the first and second shots.

3. The method of claim 2, said steps of injection molding the first and second shots further comprising injection molding the thermoplastic olefin in each of the first and second shots.

4. The method of claim 1, further comprising the step of providing first and second variations of lifter components within the rotary injection tool.

5. The method of claim 1, further comprising the step of injection molding, in a third shot, a seal onto a surface of the second shot panel skin.

6. The method of claim 5, further comprising a core pull back mechanism integrated into the die cavity which is retracted to successively form the seal in communication with the panel skin.

7. The method of claim 1, further comprising the step of extruding a seal onto a surface of the second shot panel skin.

8. The method of claim 1, further comprising the steps of forming the second shot skin in first and second individual sections and of injection molding, in a third shot, a seal interconnecting said second shot skin sections of panel skin.

9. The method of claim 8, said third shot blade further comprising any of an angled or arcuate shape.

10. The method of claim 1, said first shot injection molding of said doghouse further comprising the forming the at least one outer segmented portion as a plurality of three interconnected segmented portions.

11. The method of claim 10, further comprising the step of additionally forming a receiving configuration into an intermediate location of said interconnected segment portions for securing a support base of the clip.

* * * * *